L. JOHONNOTT.

Improvement in Potato-Diggers.

No. 128,150. Patented June 18, 1872.

Witnesses:
P. C. Dieterich
Geo. W. Mabee

Inventor:
L. Johonnott
per
Munn & Co
Attorneys.

UNITED STATES PATENT OFFICE.

LEONARD JOHONNOTT, OF BURLINGTON, VERMONT.

IMPROVEMENT IN POTATO-DIGGERS.

Specification forming part of Letters Patent No. 128,150, dated June 18, 1872.

Specification describing a new and Improved Purchase Attachment to Forks, Shovels, &c., invented by LEONARD JOHONNOTT, of Burlington, in the county of Chittenden and State of Vermont.

Figure 1:
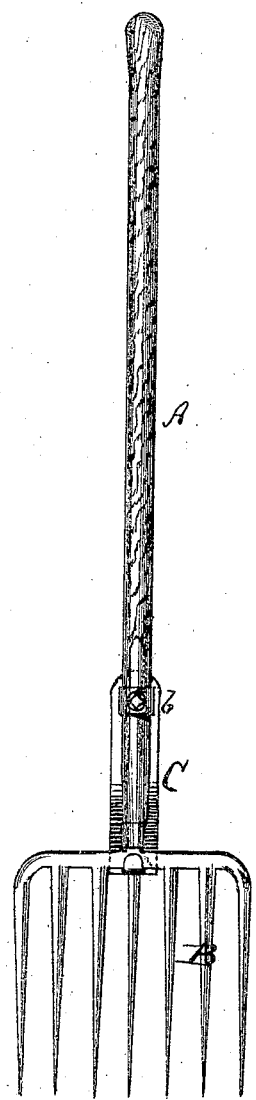
Figure 2:
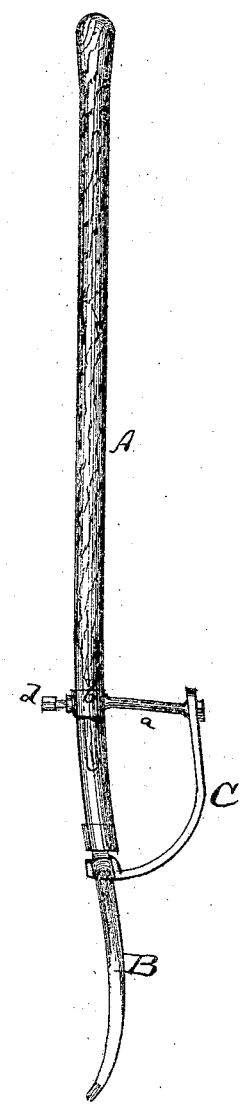

Fig. 1 represents a face view of a fork provided with my improved purchase attachment. Fig. 2 is an edge view of the same.

Similar letters of reference indicate corresponding parts.

This invention relates to a new attachment to all kinds of agricultural forks, shovels, and similar implements, whereby the same will have a bearing or fulcrum on the ground, to be more easily manipulated than without the aid of such leverage. The invention consists in the application, to the under side of the fork or shovel, of an arched plate or foot, on which the instrument can be rocked while being swung out of the ground, or while starting the elevation of a load.

A in the drawing represents the handle, and B B the tines of a potato-digger fork, of suitable kind. C is an arched plate fastened, by a stem, $a$, and sleeve $b$, to the handle, and in front made to embrace one of the tines B, as is clearly indicated in the drawing, the plate C thus forming a projecting heel on the under side of the fork. When the tines have been forced into the ground the handle is swung down so as to carry the heel C against the ground, making the same a purchase, on which the fork swings while the weight on it is being raised. This facilitates the operation of handling such instruments to a very great extent, relieving the arms of the operator from the severest strain. The heel C may be made adjustable longitudinally in order to give a greater or less purchase, as may be desired. A set-screw, $d$, or pin serves, in that case, to fasten it in the desired position.

I am aware that an adjustable fulcrum has been applied to other articles, and do not, therefore, design, broadly, to claim it as my invention; but—

What I do claim is—

The fork A B, provided with fulcrum-piece C and standard $a$, as and for the purpose described.

LEONARD JOHONNOTT.

Witnesses:
N. B. FLANAGAN,
CAROLUS NOYES.